(12) United States Patent
Lim et al.

(10) Patent No.: US 12,212,020 B2
(45) Date of Patent: Jan. 28, 2025

(54) CELL MODULE ASSEMBLY AND METHOD OF MANUFACTURING THE SAME

(71) Applicant: LG ENERGY SOLUTION, LTD., Seoul (KR)

(72) Inventors: Dae Hoon Lim, Daejeon (KR); Young Bin Im, Daejeon (KR); Sang Hyun Yu, Daejeon (KR); Jin Kyu Shin, Daejeon (KR); Kyung Hyun Bae, Daejeon (KR); Jong Kyu Anh, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 549 days.

(21) Appl. No.: 17/616,783

(22) PCT Filed: Jan. 11, 2021

(86) PCT No.: PCT/KR2021/000324
§ 371 (c)(1),
(2) Date: Dec. 6, 2021

(87) PCT Pub. No.: WO2021/149955
PCT Pub. Date: Jul. 29, 2021

(65) Prior Publication Data
US 2022/0311100 A1    Sep. 29, 2022

(30) Foreign Application Priority Data
Jan. 21, 2020   (KR) ........................ 10-2020-0008052

(51) Int. Cl.
*H01M 50/507*   (2021.01)
*H01M 10/613*   (2014.01)
(Continued)

(52) U.S. Cl.
CPC ....... *H01M 50/507* (2021.01); *H01M 10/613* (2015.04); *H01M 10/6551* (2015.04);
(Continued)

(58) Field of Classification Search
CPC ............. H01M 50/507; H01M 50/262; H01M 50/533; H01M 50/271; H01M 10/613; H01M 10/6551
See application file for complete search history.

(56) References Cited

U.S. PATENT DOCUMENTS

2011/0070474 A1   3/2011   Lee et al.
2013/0252048 A1   9/2013   Teramoto et al.
(Continued)

FOREIGN PATENT DOCUMENTS

CN   209418570 U   9/2019
CN   113748563 A   12/2021
(Continued)

OTHER PUBLICATIONS

Extended European Search Report for European Application No. 21744058.5, dated Jun. 2, 2023.
(Continued)

*Primary Examiner* — Karie O'Neill Apicella
(74) *Attorney, Agent, or Firm* — Birch, Stewart, Kolasch & Birch, LLP

(57) ABSTRACT

A cell module assembly includes a plurality of battery cells, each of the battery cells having electrode leads, a case configured to receive the battery cells, a cover plate located at an open upper surface of the case so as to be coupled to the case, and a busbar unit located at the front and the rear of the case, from which the electrode leads of the received battery cells protrude. The case is configured to have a U shape in which a base plate defining a bottom surface of the case and side plates defining opposite side surfaces of the case are coupled to each other, and the busbar unit includes a busbar frame, one side of which is bent, whereby a process of manufacturing the cell module assembly is simplified and the battery cells are easily received in the case.

12 Claims, 6 Drawing Sheets

(51) Int. Cl.
*H01M 10/6551* (2014.01)
*H01M 50/262* (2021.01)
*H01M 50/271* (2021.01)
*H01M 50/533* (2021.01)

(52) U.S. Cl.
CPC ....... *H01M 50/262* (2021.01); *H01M 50/271* (2021.01); *H01M 50/533* (2021.01)

(56) References Cited

U.S. PATENT DOCUMENTS

| | | | |
|---|---|---|---|
| 2016/0126531 A1 | 5/2016 | Kim et al. | |
| 2018/0159096 A1 | 6/2018 | Kim et al. | |
| 2018/0183119 A1* | 6/2018 | Ju | H01M 50/505 |
| 2019/0131596 A1 | 5/2019 | Yang et al. | |
| 2019/0267591 A1 | 8/2019 | Park et al. | |
| 2019/0348720 A1 | 11/2019 | Oh et al. | |
| 2019/0389318 A1 | 12/2019 | Lee et al. | |
| 2020/0014005 A1 | 1/2020 | Lee et al. | |
| 2020/0035980 A1 | 1/2020 | Hong et al. | |
| 2021/0036277 A1 | 2/2021 | Seo et al. | |
| 2022/0131229 A1 | 4/2022 | Chi et al. | |

FOREIGN PATENT DOCUMENTS

| | | |
|---|---|---|
| EP | 3 926 708 A1 | 12/2021 |
| EP | 2 416 438 A2 | 11/2024 |
| JP | IP2004-247320 A | 9/2004 |
| JP | 2013-197049 A | 9/2013 |
| JP | 2013-242979 A | 12/2013 |
| JP | IP2018-530107 A | 10/2018 |
| JP | 2022-524739 A | 5/2022 |
| KR | 10-2010-0109871 A | 10/2010 |
| KR | 10-2014-0130357 A | 11/2014 |
| KR | 10-1565115 B1 | 11/2015 |
| KR | 10-2015-0142338 A | 12/2015 |
| KR | 10-2018-0099438 A | 9/2018 |
| KR | 10-2018-0113416 A | 10/2018 |
| KR | 10-2018-0135604 A | 12/2018 |
| KR | 10-2019-0001409 A | 1/2019 |
| KR | 10-2019-0078521 A | 7/2019 |
| KR | 10-2019-0106060 A | 9/2019 |
| KR | 10-2019-0120154 A | 10/2019 |
| KR | 10-2019-0133126 A | 12/2019 |

OTHER PUBLICATIONS

International Search Report (PCT/ISA/210) Issued in PCT/KR2021/000324, dated Apr. 19, 2021.

* cited by examiner

[FIG. 1]
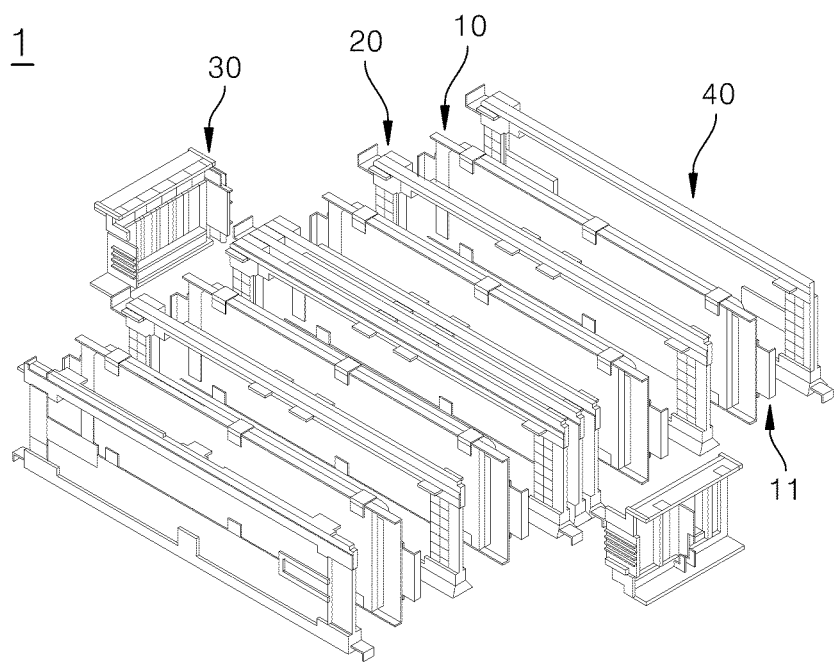

[FIG. 2]
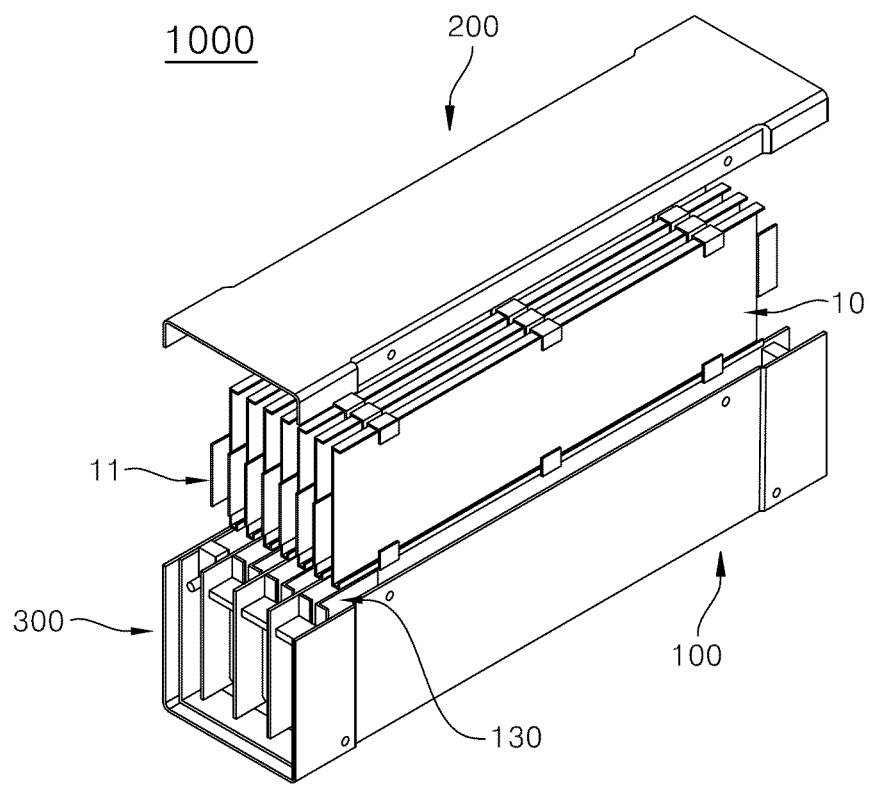

[FIG. 3]
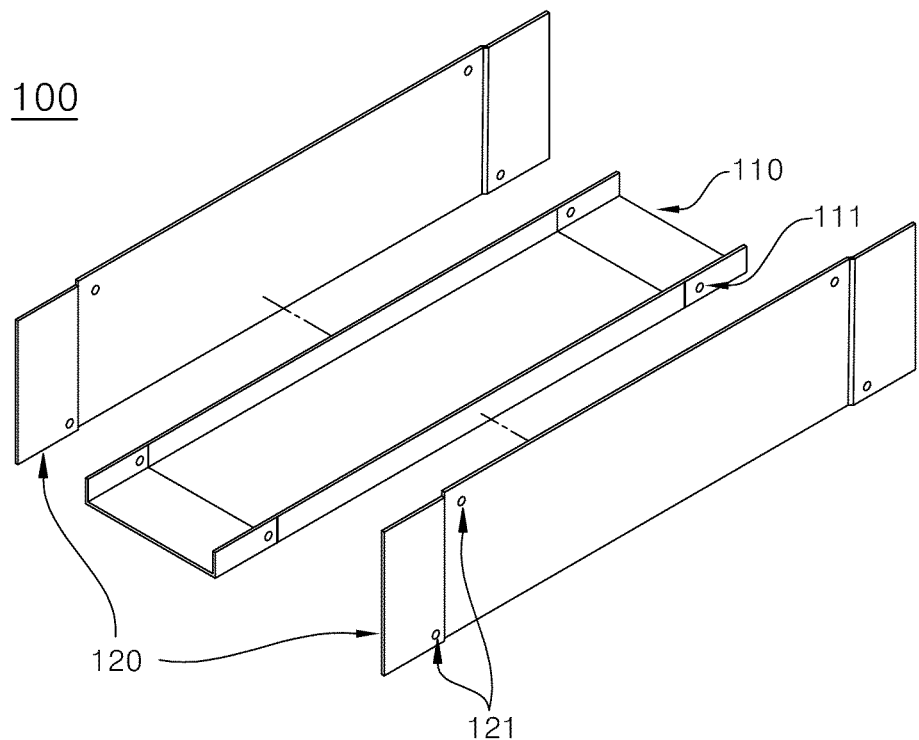
[FIG. 4]
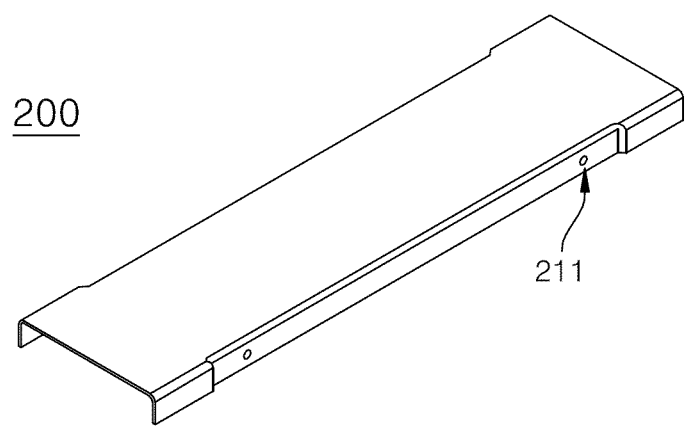

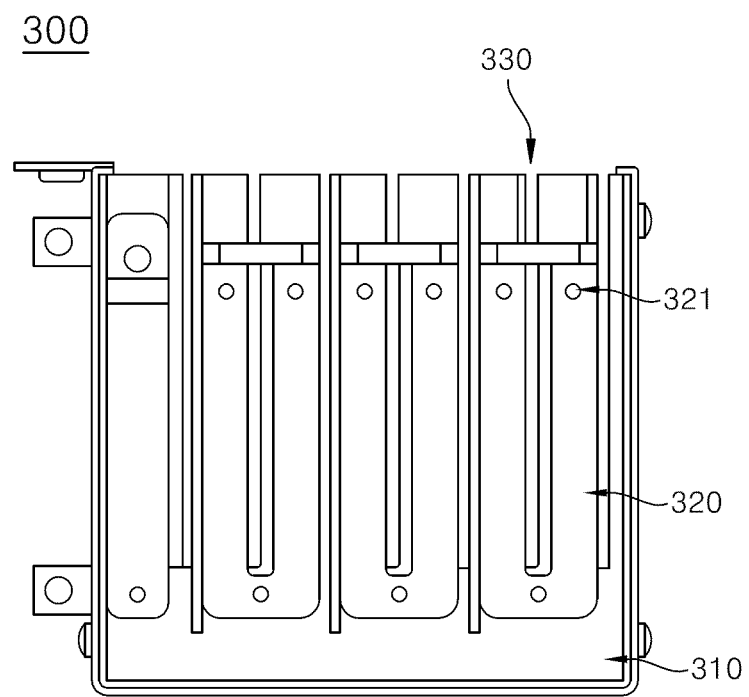
[FIG. 5]

CELL MODULE ASSEMBLY AND METHOD OF MANUFACTURING THE SAME

TECHNICAL FIELD

This application claims the benefit of priority to Korean Patent Application No. 2020-0008052 filed on Jan. 21, 2020, the disclosure of which is hereby incorporated by reference herein its entirety.

The present invention relates to a cell module assembly formed by receiving a battery cell in a case having a busbar unit integrally coupled thereto.

BACKGROUND ART

With technological development of mobile devices, such as mobile phones, laptop computers, camcorders, and digital cameras, and an increase in demand therefor, technologies related to secondary batteries, which are capable of being charged and discharged, have been active. In addition, secondary batteries, which are energy sources substituting for fossil fuels causing air pollution, have been applied to an electric vehicle (EV), a hybrid electric vehicle (HEV), a plug-in hybrid electric vehicle (P-HEV), and an energy storage system (ESS).

The energy storage system (ESS) is a system that stores a large amount of excess power in a battery in order to use the stored power when needed. The energy storage system serves to uniformly maintain quality of power in connection with new and renewable energy generation and to increase efficiency in use of power by storing power at the time when the amount of use of power is small and using the stored power when the demand for power is high. The ESS may mainly be classified as a grid system ESS, an uninterruptible power supply (UPS), or an ESS for domestic use.

There are a lithium ion battery, a lithium polymer battery, a nickel-cadmium battery, a nickel-hydride battery, and a nickel-zinc battery as secondary batteries that are widely used at present. The operating voltage of a unit secondary battery cell, i.e. a unit battery cell, is about 2.0V to 5.0V. In the case in which output voltage higher than the above operating voltage is required, therefore, a plurality of battery cells may be connected to each other in series to constitute a cell module assembly. In addition, cell module assemblies may be connected to each other in series or in parallel to constitute a battery module depending on required output voltage or charge and discharge capacities. In general, a battery pack is manufactured using at least one battery module by adding an additional component.

Meanwhile, a conventional cell module assembly 1 will be described with reference to FIG. 1. Battery cells 10, each of which has electrode leads 11, and cartridges 20 are alternately disposed between end covers 40 located at the outer sides of the cell module assembly, and a busbar unit 30, configured to be electrically connected to the electrode leads 11, is coupled to the front and the rear of the battery cells 10, from which the electrode leads 11 protrude, whereby the cell module assembly 1 is formed.

In such a cell module assembly, however, it is necessary to perform a complicated process of alternately stacking the end covers 40, the battery cells 10, and the cartridges 20 so as to be assembled and coupling the busbar unit 30 to the stack. Furthermore, when the cell module assembly is wrongly assembled, it takes considerable time to reassemble the cell module assembly.

DISCLOSURE

Technical Problem

The present invention has been made in view of the above problems, and it is an object of the present invention to provide a cell module assembly having a battery cell received in a case to which a busbar unit including a busbar frame, one side of which is bent so as to receive the battery cell, is coupled.

Technical Solution

In order to accomplish the above object, a cell module assembly according to the present invention includes a plurality of battery cells, each of the plurality of battery cells having electrode leads, a case configured to receive the plurality of battery cells, a cover plate located at an open upper surface of the case so as to be coupled to the case, and a busbar unit located at the front and the rear of the case, from which the electrode leads of the received battery cells protrude, wherein the case is configured to have a U shape in which a base plate defining the bottom surface of the case and side plates defining opposite side surfaces of the case are coupled to each other.

Also, in the cell module assembly according to the present invention, the case and the busbar unit may be integrally coupled to each other before the battery cells are received in the case.

Also, in the cell module assembly according to the present invention, the busbar unit may include a busbar body having slits, through which the electrode leads are inserted, and a busbar frame coupled to the busbar body, the busbar frame being joined to the electrode leads inserted into the busbar unit.

Also, in the cell module assembly according to the present invention, the busbar frame may be provided with slits, through which the electrode leads are inserted, formed at positions corresponding to the slits formed in the busbar body, one end of the busbar frame being bent to the outside of the case.

Also, in the cell module assembly according to the present invention, side walls extending perpendicularly from the base plate may be formed in the case, the side walls being configured to guide positions of the plurality of battery cells received in the case.

Also, in the cell module assembly according to the present invention, the side walls may be cooling fins configured to dissipate heat generated from the battery cells.

Also, in the cell module assembly according to the present invention, the case and the cover plate may be coupled to each other by mechanical fastening.

In addition, a method of manufacturing a cell module assembly according to the present invention includes coupling a base plate defining a bottom surface and side plates defining opposite side surfaces to each other to form a U-shaped case configured to receive a plurality of battery cells, each of the battery cells having electrode leads, coupling a busbar unit to the front and the rear of the case, from which the electrode leads protrude, receiving the battery cells in the case having the busbar unit coupled thereto, and locating a cover plate at the upper part of the case having the battery cells received therein and coupling the cover plate to the side plates of the case.

Also, in the method of manufacturing the cell module assembly according to the present invention, the may include forming slits in a busbar body of the busbar unit, inserting the electrode leads through the slits, and coupling a busbar frame to the busbar body, the busbar frame being joined to the electrode leads inserted into the busbar unit.

Also, in the method of manufacturing the cell module assembly according to the present invention, may include forming slits in the busbar frame, inserting the electrode leads through the slits in the barber frame which are formed at positions corresponding to the slits formed in the busbar body, and bending one end of the busbar frame to the outside of the case.

Also, in the method of manufacturing the cell module assembly according to the present invention, may include coupling the case and the cover plate to each other by mechanical fastening.

Also, the method of manufacturing the cell module assembly according to the present invention may further include forming side walls extending perpendicularly from the base plate before the step of receiving the battery cells, the side walls being configured to guide positions of the battery cells received in the case.

In addition, a battery module according to the present invention includes at least one cell module assembly according to the present invention.

In addition, a device according to the present invention includes at least one battery module according to the present invention.

Advantageous Effects

A cell module assembly according to the present invention has an advantage in that battery cells are received in a case having a busbar unit integrally coupled thereto, whereby it is possible to reduce time required for an assembly process, compared to a conventional structure in which battery cells and cartridges are sequentially stacked.

In addition, the cell module assembly according to the present invention has an advantage in that one side of the busbar unit coupled to the case is bent to the outside of the case, whereby it is possible to easily receive and remove the battery cells.

In addition, the cell module assembly according to the present invention has an advantage in that only a cover plate at the upper part of the case is separated from the cell module assembly, whereby it is possible to easily perform the inspection of external appearance of the battery cells and the measurement of insulation voltage of the battery cells.

BRIEF DESCRIPTION OF DRAWINGS

FIG. 1 is an exploded perspective view of a conventional cell module assembly.

FIG. 2 is a schematic view of a cell module assembly according to the present invention.

FIG. 3 is an exploded perspective view of a case according to the present invention.

FIG. 4 is a schematic view of a cover plate according to the present invention.

FIG. 5 is a schematic view showing the front shape of a busbar unit according to the present invention.

BEST MODE

Figure 6:
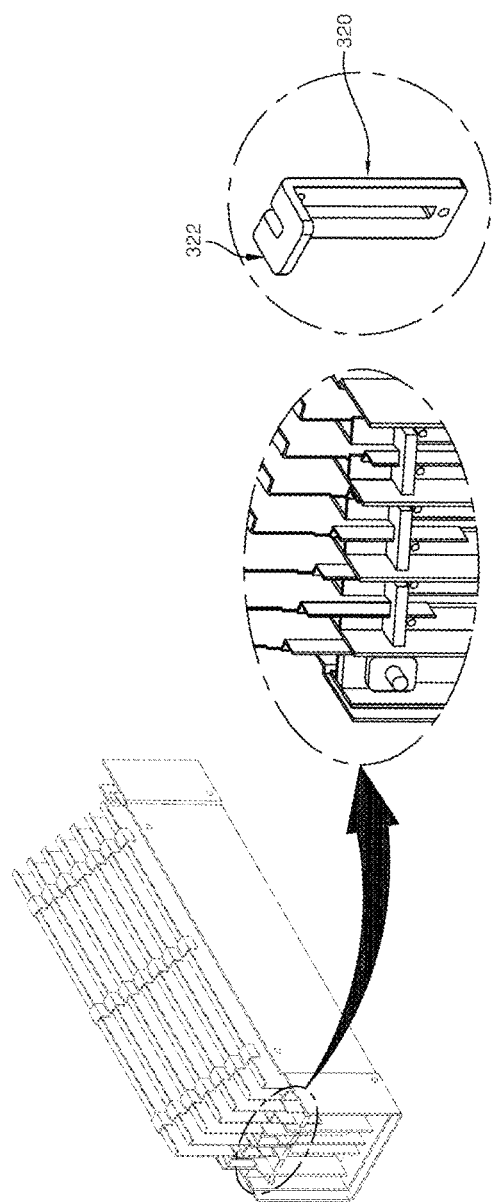
FIG. 6 is a detailed view of the busbar unit according to the present invention.

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a cell module assembly according to the present invention will be described with reference to the accompanying drawings.

FIG. 2 is a schematic view of a cell module assembly according to a first preferred embodiment of the present invention.

The cell module assembly 1000 will be described with reference to FIG. 2. The cell module assembly 1000 according to the present invention includes a plurality of battery cells 10, each of which has electrode leads 11, a case 100 configured to receive the battery cells, a cover plate 200 located at the upper part of the case 100 so as to be coupled to the case, and a busbar unit 300 located at the front and the rear of the case, from which the electrode leads 11 protrude, so as to be electrically connected to the electrode leads. In addition, side walls 130 extending perpendicularly from the lower part of the case 100 in order to guide the positions of the battery cells 10 received in the case may be formed in the case 100. Each of the side walls 130 may have a size that covers only a portion of each of opposite ends of a corresponding one of the battery cells 10 received in the case. Depending on circumstances, each of the side walls may have a size that covers the entirety of a corresponding one of the battery cells 10 received in the case. In addition, cooling fins may be used to discharge heat generated from the battery cells 10 to the side walls 130.

Each of the battery cells used in the cell module assembly 1000 according to the present invention may be constituted by a secondary battery. Based on the kind and shape of a sheathing member, the secondary battery may be generally classified as a pouch-shaped secondary battery, a cylindrical secondary battery, or a prismatic secondary battery. Preferably, a pouch-shaped secondary battery is used as the battery cell according to the present invention.

Meanwhile, the case 100 and the cover plate 200 will be described in detail with reference to FIGS. 3 and 4. The case 100 includes a base plate 110 located at the lower part thereof and side plates 120 located at opposite side surfaces thereof. The base plate 110 and the side plates 120 are provided with fastening portions 111 and 121 for coupling between adjacent plates. In addition, the cover plate 200 is also provided with fastening portions 211 for coupling with the case 100. Coupling between the base plate 110 and the side plates 120 and coupling between the side plates 120 and the cover plate 200 are performed through the fastening portions 111, 121, and 211. Any of various known methods, such as mechanical fastening using bolts or welding, may be used as such a fastening method. In particular, it is more preferable that fastening between the side plates 120 and the cover plate 200 be performed by mechanical fastening such that disassembly and fastening therebetween are easily performed even after the battery cells 10 are received in the case 100.

In addition, the busbar unit 300 will be described with reference to FIGS. 5 and 6. The busbar unit 300 includes a busbar body 310 including slits 330, in which the electrode leads 11 are located, and a busbar frame 320 coupled to the busbar body 310, the busbar frame being provided with slits 330, in which the electrode leads 11 may be received, formed at positions corresponding to the slits 330 of the busbar body. The busbar frame 320 is provided with fastening portions 321 for assembly with the busbar body, and fastening portions (not shown) corresponding thereto may also be formed at the busbar body 310.

In addition, the busbar frame 320 includes a bent portion 322 bent from one side thereof to the outside of the case so as not to interfere with the electrode lead 11 of the battery cell 10 received in the case. In the figures, a busbar frame 320, from which the bent portion is bent so as to have a bending angle perpendicular thereto, is shown; however, this is merely one of possible examples. The bending angle may be changed within a range within which there is no interference between the electrode lead 11 and the busbar frame 320 when the battery cell 10 is inserted into the case 100.

As described above, the bent portion 322 is formed at the portion of the busbar frame 320, at which the electrode lead 11 starts to be received. In the present invention, therefore, the battery cells 10 can be easily received in the case 100 even after the busbar unit 300 is first coupled to the case, unlike the conventional cell module assembly, in which the busbar unit is coupled after the battery cells 10 and the cartridges are stacked. Since the busbar unit 300 is assembled to the case 100 in advance, as described above, it is possible to simplify a process of manufacturing the cell module assembly and in addition to shorten a process time. Any of various known methods, such as mechanical fastening using bolts or welding, may be used as a method of assembling the busbar unit 300 to the case 100.

Figure 7:
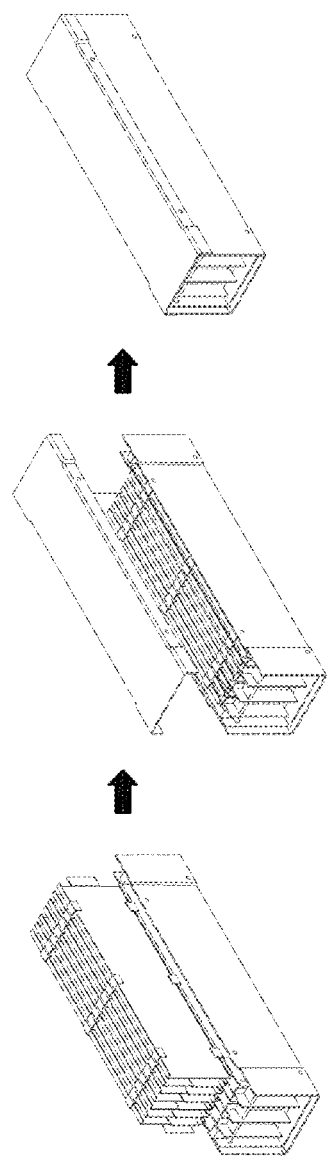
FIG. 7 is a schematic view showing a method of manufacturing a cell module assembly according to the present invention.

Meanwhile, a method of manufacturing a cell module assembly according to the present invention will be described with reference to FIG. 7. First, as shown in the left figure, battery cells 10 are received in a case 100 having a busbar unit 300 coupled thereto, and electrode leads 11 of the battery cells 10 received in the case are joined to a busbar frame 320 such that the electrode leads 11 are electrically connected to the busbar unit 300. A known electrode lead joining method, such as welding, may be used as a joining method. Subsequently, as shown in the middle figure, a cover plate 200 is located at the upper part of the battery cells 10 received in the case, and the cover plate 200 is fastened to side plates 120 to manufacture a cell module assembly 1000, as shown in the right figure.

Depending on circumstances, a process of forming side walls 130 extending perpendicularly from a base plate 110, the side walls being configured to guide the positions of the battery cells 10 received in the case 100, before the battery cells 10 are received in the case may be included. Each of the side walls 130 may be formed so as to have any of various sizes within a range of size of an inner space of the case 100 in which the battery cells 10 are received.

The cover plate 200 at the upper part of the case may be separated from the cell module assembly 1000 according to the present invention manufactured as described above, whereby the inspection of external appearance of the battery cells 10 and the measurement of insulation voltage of the battery cells may be easily performed.

In addition, it is possible to manufacture a battery module using the cell module assembly 1000 according to the present invention. The battery module may include an external connection terminal configured to connect at least one cell module assembly 1000 to an external electric device and a heat sink configured to dissipate heat generated from the battery cells.

In addition, one or more battery modules may be connected to each other using an electrical connection method in order to constitute a battery pack. The battery pack may be applied to an electric vehicle (EV), a hybrid electric vehicle (HEV), a plug-in hybrid electric vehicle (P-HEV), or an energy storage system (ESS).

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS 1, 1000: Cell module assemblies
10: Battery cell
20: Cartridge
30, 300: Busbar units
40: End cover
100: Case
110: Base plate
111, 121, 211, 321: fastening portions
120: Side plate
130: Side wall
200: Cover plate
310: Busbar body
320: Busbar frame
322: Bent portion
330: Slit

The invention claimed is:
1. A cell module assembly comprising:
a plurality of battery cells, each of the plurality of battery cells having electrode leads;
a case configured to receive the plurality of battery cells;
a cover plate located at an open upper surface of the case so as to be coupled to the case; and
a busbar unit located at a front and a rear of the case, from which the electrode leads of the received battery cells protrude,
wherein the case is configured to have a U shape in which a base plate defining a bottom surface of the case and side plates defining opposite side surfaces of the case are coupled to each other,
wherein the busbar unit comprises a busbar body having slits, through which the electrode leads are inserted, and a busbar frame coupled to the busbar body, the busbar frame being joined to the electrode leads inserted into the busbar unit, and
wherein the busbar frame is provided with slits, through which the electrode leads are inserted, formed at positions corresponding to the slits formed in the busbar body, one end of the busbar frame being bent to an outside the case.

2. The cell module assembly according to claim 1, wherein the case and the busbar unit are integrally coupled to each other before the battery cells are received in the case.

3. The cell module assembly according to claim 1, wherein side walls extending perpendicularly from the base plate are formed in the case, the side walls being configured to guide positions of the plurality of battery cells received in the case.

4. The cell module assembly according to claim 3, wherein the side walls are cooling fins configured to dissipate heat generated from the battery cells.

5. The cell module assembly according to claim 1, wherein the case and the cover plate are coupled to each other by mechanical fastening.

6. A method of manufacturing a cell module assembly, the method comprising:
- coupling a base plate defining a bottom surface and side plates defining opposite side surfaces to each other to form a U-shaped case configured to receive a plurality of battery cells, each of the battery cells having electrode leads;
- coupling a busbar unit to a front and a rear of the case, from which the electrode leads protrude;
- receiving the battery cells in the case having the busbar unit coupled thereto; and
- locating a cover plate at an upper part of the case having the battery cells received therein and coupling the cover plate to the side plates of the case;
- forming slits in a busbar body of the busbar unit;
- inserting the electrode leads through the slits;
- forming slits in the busbar frame;
- bending one end of the busbar frame to an outside of the case,
- inserting the electrode leads through the slits in the busbar frame which are formed at positions corresponding to the slits formed in the busbar body, and
- coupling the busbar frame to the busbar body, the busbar frame being joined to the electrode leads inserted into the busbar unit.

7. The method according to claim 6, further comprising:
coupling the case and the cover plate to each other by mechanical fastening.

8. The method according to claim 6, further comprising forming side walls extending perpendicularly from the base plate before the step of receiving the battery cells, the side walls being configured to guide positions of the battery cells received in the case.

9. A battery module comprising the cell module assembly according to claim 1.

10. A device comprising the battery module according to claim 9.

11. The cell module assembly according to claim 1, wherein the busbar unit comprises slits extending downwardly from a top edge of each busbar unit.

12. The method according to claim 6, further comprising:
forming slits in each busbar unit that extend from a top edge of each busbar unit.

* * * * *